Patented June 6, 1939

2,161,317

UNITED STATES PATENT OFFICE 2,161,317

OXIDATION INHIBITOR AND PROCESS FOR PREPARING SAME

Alexander N. Sachanen and Pharez G. Waldo, Woodbury, N. J., assignors to Socony-Vacuum Oil Company, Incorporated, New York, N. Y., a corporation of New York No Drawing. Application May 18, 1937, Serial No. 143,328

4 Claims. (Cl. 23—239)

This invention has to do with substances capable of inhibiting the deterioration of hydrocarbon oils by oxidation. This application is specifically concerned with certain materials, which when added to hydrocarbon oils in small amounts, accomplish the above purpose, and which inhibited materials have been prepared from mineral oil sulphonic acid bodies derived from cracked products of higher boiling point than gasoline.

This invention is based upon the discovery that if there be separated by distillation certain products boiling between 200° and 400° C., which occur in cracking tar or recycle stock, that these products may be treated with strong sulphuric acid, resulting in the production of a "green" sulphonic acid which may be isolated from the sludge. If these acids be further saponified with sodium or potassium and then further treated by melting with additional quantities of sodium and potassium hydroxide, an oil-soluble product is produced which is capable of inhibiting the oxidation of hydrocarbon materials as shown by its ability to greatly lengthen the oxygen bomb induction period of cracked gasoline and similar materials.

This substance has inhibitive properties for heavier oil fractions as well, particularly for the inhibition of oxidation of turbine and transformer oils, as will be later set forth.

It is known that when petroleum fractions are treated with sulphuric acid, especially with strong acid or oleum, mineral oil sulphonic acid compounds are formed. These mineral oil sulphonic acid compounds are known to be of two distinct types, one of which is characterized by its oil solubility and the other is characterized by its water solubility.

In the usual practice for the preparation of these sulphonic acid bodies, the oil is treated with strong sulphuric acid or oleum either for refinement of the oil or specifically for production of sulphonic bodies. The treatment may be carried out either in one stage or many stages, and the resulting sludge is separated from the oil. The oil which has been freed of sludge is then treated, either before or after neutralization, with water or an aqueous solution containing a water-soluble solvent such as alcohol or acetone in order to remove the sulphonic acid products remaining in the oil, and these products are recovered from the aqueous extract either by "salting out" or distilling off the aqueous solvent. The sulphonic acids thus recovered from the oil phase are commonly designated "mahogany" or "brown" acids because of their color and are usually characterized by their solubility in oil which is much better than their solubility in water.

The sludge separated from the above operation, with or without neutralization, yields sulphonic acids of a different kind upon digestion with water. Because of their color, these acids are commonly known as "green" acids and generally exhibit the property of relatively low solubility in oil compared to the mahogany acids and better solubility in water. It is these green acids with which the present invention is concerned.

The term "green acids" is well known in the art being used commonly in scientific literature patents, etc., and indicates a definite product to the art. For instance the production and treatment of "green acids" is discussed in detail in patents such as Humphreys et al. Patent 1,474,933 and Ramayya Patent 1,935,666. Although green acids are well known as a definite product hardly anything is known of the exact chemical structure of the compounds except that they are a highly complex mixture of sulphonic acids of various molecular weights. However since green acids indicate a definite product to the art it is believed unnecessary to know the chemical structure of the compounds involved for a full appreciation of the present invention.

As an example of one of our inhibitive compounds and the method of preparation thereof, the following discussion is given. The starting material is that portion of a cracking tar boiling between 200° and 400° C., and may be collected by subjecting cracked tar to distillation at ordinary pressure with collection of the proper portion of the distillate cut. This material may also be found in the recycle stock corresponding to the cracking tar, since its presence in one or the other is dependent merely upon the cut point between recycle and tar determined by the cracking operation. This material may be described as a cracked product boiling between 200° and 400° C. As is well known such cracked fractions contain a considerable amount of unsaturated compounds and possess a rather high iodine number (see pages 236–241 of Chemistry and Technology of Cracking, by Sachanen and Tilicheyev, The Chemical Catalog Co. Inc., N. Y. 1932).

The above cracked distillate is then treated, in one dump with about 20% or more of its volume of sulphuric acid containing 90% or more concentrated $H_2SO_4$, preferably about 98% of $H_2SO_4$. This operation produces sulphonic acid bodies of various kinds, as indicated above, and those desired for the present purpose may be recovered by the following process: First a portion of the oil may be withdrawn, if desired, although this step is not necessary. Then water is added to the mixture of sludge and oil, the amount of water added being roughly equal to the amount of sludge present, that is amounting to 20% to 50% or more by volume of the original oil treated and the whole is heated moderately to 60° to 80° C. for about 1–2 hours, resulting in the separation of the mixtures into three layers, the upper of which is a layer of oil, the middle layer of which is a mixture of "green" acids insoluble in oil and relatively insoluble in water in the presence of sulphuric acid, and the lower layer of which is a dilute solution of sulphuric acid. Of these three layers the oil and acid water are discarded, and the "green" acid, preferably removed to another vessel, is neutralized with a hydroxide of a strong alkali, such as sodium hydroxide and then boiled in the usual fashion to dehydrate it, stopping preferably at a water content of about 10%. The dehydrated soap is then melted with about an equal amount of sodium hydroxide or potassium hydroxide or a mixture of sodium and potassium hydroxides at a temperature of 225° to 300° C. for a period of about three hours, after which the whole is treated with dilute sulphuric acid containing about 40–60% $H_2SO_4$, resulting in the separation of the mixture into two layers, the upper of which is the desired product and the lower of which is an aqueous solution of sulphates and other impurities.

The above treatment of the reaction mixture may be modified in the following manner, due to the insolubility of the reaction products in fused alkalies. After the reaction is completed, the reaction products may be allowed to collect as an upper layer and may be separated from the fused alkalies. The reaction products separated by this method are treated with dilute sulphuric acid as has been described. The product may be extracted with naphtha and the naphtha distilled off, and then further extracted with ethyl alcohol, followed by distillation to remove the alcohol, or similar methods of purification may be used. The product is insoluble in water and is highly soluble in oils. In hydrocarbon oils it has been found to be an oxidation inhibitor of considerable value.

That our inhibitors are quite effective, particularly in the protection of gasoline, may be seen from the following tabulation wherein five tests were conducted, the test being that of determining the oxygen bomb induction period:

| Material tested | Concentration inhibitor | Induction period |
| --- | --- | --- |
|  | Percent |  |
| Gasoline alone | 0 | 2.30 |
| Gasoline+inhibitor | 0.02 | 5.45 |
| Gasoline+inhibitor | 0.05 | 10.45 |
| Gasoline alone | 0 | 2.45 |
| Gasoline+inhibitor | 0.05 | 15.40 |
| Gasoline alone | 0 | 2.40 |
| Gasoline+inhibitor | 0.05 | 13.55 |

The first test reported is a control of gasoline alone, without any inhibitor, showing an induction period of 2 hours and 30 minutes. In the second and third tests the gasoline was mixed with 0.02% and 0.05% of an inhibitor derived from recycle stock and the induction period was about doubled and uadrupled for the respective tests. In the fourth and fifth tests tabulated, the effect of 0.05% of inhibitive material, derived from a cracked tar is shown. The sixth and seventh tests show the inhibitive action of an inhibitor from another recycle stock. In these cases the induction period of the gasoline became four to six times as great as that of the untreated gasoline.

These products are also useful for the protection of viscous oils, as is shown by the following data, wherein a moderately refined transformer oil containing 0.10% inhibitor was subjected to the "German tar" test, and a highly refined oil containing 0.10% inhibitor was similarly tested. The German tar test involves prolonged oxidation with air at elevated temperature to determine weight per cent of tar formed under controlled conditions, and is widely used in evaluating resistance of viscous oils to oxidation.

*Percent tar (German tar test)*

|  | Moderately refined oil | Highly refined oil |
| --- | --- | --- |
| Blank (no inhibitor) | 0.32 | 11.7 |
| Oil plus 0.10% inhibitor | 0.04 |  |
| Oil plus 0.10% inhibitor |  | 0.05 |

This capability of inhibitive action appears to be restricted to sulphonic products of certain kinds originating in specific sources. Similar treatment of many "mahogany" sulphonic acids from various sources failed to yield any inhibitive products of commercial capabilities, and "green" acids from other sources, presumably resembling cracked products chemically, were also found incapable of yielding inhibitors of commercial capabilities.

These inhibitors may be used in proportions ranging from 0.05% to 0.50% by weight of the oil to be stabilized, the preferred amount being from 0.05% to 0.10%.

It is understood that the specific examples and data herein given are set forth only by way of illustration, and that the invention is not limited thereby or thereto, but is subject only to those limitations expressed in the following claims.

We claim:

1. An inhibitor capable of retarding deterioration of petroleum oils by oxidation prepared by treating cracked petroleum products boiling between 200° and 400° C. with about 20% by volume of strong sulphuric acid, digesting the reaction mixture with water and separating a solution of "green" sulphonic acids therefrom, saponifying the acids with a strong alkali and substantially dehydrating the soap, fusing the soap with a hydroxide of a strong alkali, neutralizing the reaction mixture, and purifying the water-insoluble product.

2. The method of preparing an oxidation inhibitor for petroleum oils comprising the following steps: Treating a fraction of cracked petroleum products boiling between 200° C. and 400° C. with about 20% of its volume of concentrated sulphuric acid, digesting the reaction mixture with water and separating a mixture of "green" sulphonic acids therefrom, saponifying the acids with a strong alkali and substantially dehydrating the soap, fusing the soap with a hydroxide of a strong alkali, neutralizing the reaction mixture, and purifying the water-insoluble product.

3. An inhibitor capable of retarding deterioration of petroleum oils by oxidation prepared by sulphonating a cracked petroleum fraction boiling between 200° and 400° C. to produce a "green" sulphonic acid, saponifying said acid with a strong alkali, fusing the soap with a hydroxide of a strong alkali, neutralizing the reaction mixture and purifying the water insoluble product obtained.

4. The method of preparing an oxidation inhibitor for petroleum oils comprising the following steps: Sulphonating a cracked petroleum fraction boiling between 200° and 400° C. to produce a "green" sulphonic acid, saponifying said acid with a strong alkali, fusing the soap with a hydroxide of a strong alkali, neutralizing the reaction mixture and purifying the water insoluble product obtained.

ALEXANDER N. SACHANEN.
PHAREZ G. WALDO.